UNITED STATES PATENT OFFICE.

CÆSAR MARTER, OF LONDON, ENGLAND.

HARD-RUBBER SUBSTITUTE AND PROCESS FOR MAKING THE SAME.

No. 867,737.  Specification of Letters Patent.  Patented Oct. 8, 1907.

Application filed July 1, 1907. Serial No. 381,787.

*To all whom it may concern:*

Be it known that I, Cæsar Marter, a citizen of the Republic of France, of 105 Old street, in the city of London, England, have invented a new and useful Improvement Relating to Hard-Rubber Substitute and Process for Making the Same, of which the following is a specification.

This invention relates to the manufacture of a new and improved composite substance which has some or all of the properties of vulcanite or ebonite and this invention also relates to an improved method of manufacturing vulcanite or ebonite which while it effects a saving on expensive rubber and the like, still results in a product which has all the beneficial properties of ordinary or the best vulcanite or ebonite.

According to this invention I take tan or spent tan or the bark of such trees as oak, chestnut, hemlock, mimosa, and the like, or sumach, myrobalans, cutch, and the like (*i. e.* vegetable material containing considerable proportions of tannin or tannic acid all of which I will hereinafter for the sake of brevity refer to as "spent tan") and having reduced the same to a powder I mix therewith a certain proportion of sulfur so that the mixture contains from 25 percent to 33 per cent of sulfur, and subject the whole to heat with continuous stirring until the product is in the form of a coarse black powder. The coarse black powder is then allowed to cool, is ground to a fine powder and is placed in a suitable mold advantageously under pressure. The mold is then heated by any suitable means whereby the contents thereof set into a hard, durable mass of the shape of the mold and possessing the properties of vulcanite or ebonite. If it is desired to produce a superior article I mix the said black powder before introducing the same into the mold with the desired proportion of a solution of raw rubber or equivalent material until a thick paste is formed and I then dry this paste, place it in the mold and heat it in the manner aforesaid.

The following is an advantageous method of carrying this my invention into practice:—I take my spent tan in a dry state, comminute or grind the same to powder and carefully incorporate and mix therewith powdered sulfur so that in the resulting mixture there is from 25 per cent to 33 per cent of sulfur. I introduce the said mixture into a suitable vessel or receptacle and place the same on an open fire. It is not necessary to cover the said vessel or receptacle but the same may be left open to the atmosphere. The heating is maintained with continuous stirring until the sulfur melts. After sufficient heating the contents of the vessel or receptacle assume the appearance of a coarse black powder. The heating is then stopped and the said coarse powder taken out, cooled and ground to a fine powder. A suitable mold is then taken submitted to a preliminary heating and the interior brushed over with a warm solution of soap water, to prevent the said powder from sticking to the mold. The said fine powder is then introduced into the mold advantageously under pressure and the mold is then closed and heated by any suitable means, *e. g.* by steam. After some time the contents of the mold assume a hard homogeneous nature and the mold is then opened and the contents removed. The composition or substance so formed will be found to possess the properties of vulcanite or ebonite to a marked degree.

If it is desired to produce a superior composition rubber or some equivalent substance is mixed with the said black powder before the same is introduced into the mold. The rubber is mixed with the said powder in the form of a solution and the whole is stirred until a thick homogeneous paste is formed, this is dried, then introduced into the mold and treated in the manner described above.

The amount of rubber used will of course depend on the quality of the composition it is desired to produce.

In carrying out the above process it is necessary to take care that the spent tan is not carbonized as this appears to destroy the electric insulating properties of the resultant composition. It is also necessary to use such an excess of sulfur that there is sufficient to effect or assist in the change that takes place in the mold.

I am aware it has been proposed to make a cork substitute containing rubber, sulfur and pulverized bark.

What I claim as my invention and desire to secure by Letters Patent, is:—

1. The process of making a hard rubber substitute, which consists in mixing powdered vegetable material containing a considerable proportion of tannin or tannic acid with sulfur and molding the same under heat, substantially as described.

2. The process of making a hard rubber substitute, which consists in pulverizing vegetable material containing a considerable proportion of tannin or tannic acid, mixing therewith sulfur, heating and stirring the mixture until it is in the form of a black powder, pulverizing said powder and molding it under heat, substantially as described.

3. The process of making a hard rubber substitute, which consists in pulverizing vegetable material containing a considerable proportion of tannin or tannic acid, mixing the powder with sulfur, heating and stirring the mixture until a coarse black powder is produced, pulverizing said black powder, mixing with it a solution of raw rubber and hardening the same under the influence of pressure and heat, substantially as described.

4. A hard rubber substitute composed of a powdered vegetable material containing a considerable proportion of tannin or tannic acid mixed with sulfur, the whole mass being heated and stirred, and finally heated and molded, substantially as described.

5. A hard rubber substitute consisting of a powdered vegetable material containing a considerable proportion of tannin or tannic acid, mixed with about one-fourth its weight of sulfur and heated, the product being then mixed with raw rubber and molded under pressure and heat, substantially as described.

In witness whereof I have hereunto set my hand in the presence of two witnesses.

CESAR MARTER.

Witnesses:
ARTHUR E. EDWARDS,
ALFRED T. BRATTON.